United States Patent [19]

Inoue

[11] 3,997,753
[45] Dec. 14, 1976

[54] CONTROL SYSTEM AND METHOD FOR ELECTRIC DISCHARGE MACHINING (EDM) USING A PREDETERMINED PORTION OF EACH DISCHARGE PULSE FOR MONITORING

[76] Inventor: Kiyoshi Inoue, 3-chome 16-8, Kamiyoga, Setagaya, Tokyo, Japan

[22] Filed: Oct. 19, 1973

[21] Appl. No.: 407,961

Related U.S. Application Data

[60] Continuation-in-part of Ser. No. 272,463, July 17, 1972, Pat. No. 3,781,507, which is a division of Ser. No. 19,364, March 13, 1970, Pat. No. 3,686,461.

[30] Foreign Application Priority Data

Mar. 17, 1969 Japan .............................. 44-20518
Apr. 8, 1969 Japan .............................. 44-27070

[52] U.S. Cl. ......................... 219/69 C; 219/69 M
[51] Int. Cl.² ........................................ B23P 1/08
[58] Field of Search ............ 219/69 M, 69 G, 69 C

[56] References Cited

UNITED STATES PATENTS

| | | | |
|---|---|---|---|
| 3,474,216 | 10/1969 | Morgan | 219/69 C |
| 3,558,844 | 1/1971 | Lobur | 219/69 G |
| 3,581,043 | 5/1971 | Ullmann | 219/696 |
| 3,597,570 | 8/1971 | Saito | 219/69 C |
| 3,649,802 | 3/1972 | Sennowitz | 219/69 C |
| 3,686,461 | 8/1972 | Inoue | 219/69 G |
| 3,739,137 | 6/1973 | Marendaz | 219/69 M |
| 3,755,645 | 8/1973 | Kauffman | 219/69 C |
| 3,778,579 | 12/1973 | Takanada | 219/69 C |

*Primary Examiner*—Bruce A. Reynolds
*Attorney, Agent, or Firm*—Karl F. Ross; Herbert Dubno

[57] ABSTRACT

A method of and a system for the control of an electrical discharge machining (EDM) apparatus in which a parameter representing the condition of the machining gap is detected over a predetermined checking period, the discharge is evaluated and a good or effective discharge is discriminated from a poor or unsatisfactory discharge, and the system is controlled in response to the relative rates of occurrence of the satisfactory or unsatisfactory discharges.

5 Claims, 6 Drawing Figures

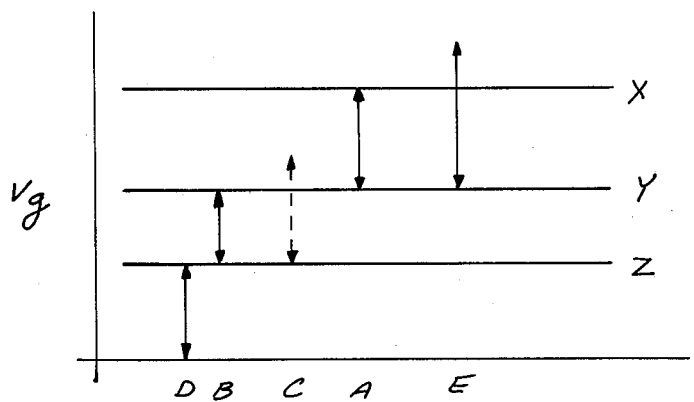
FIG. 3
FIG. 4
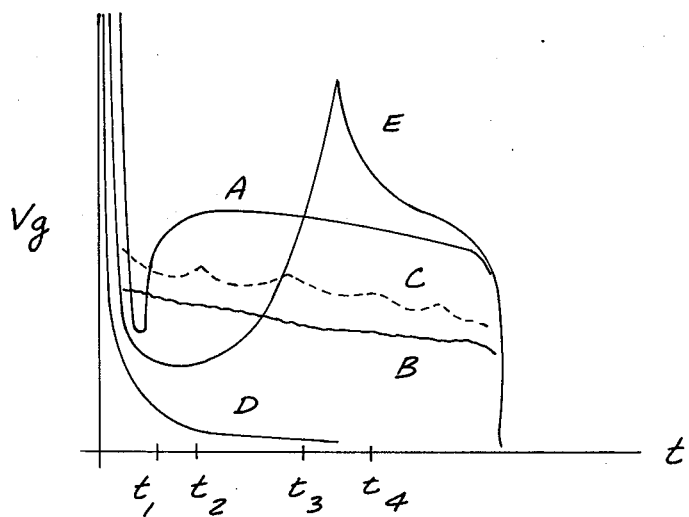

(a)

(b)

(c)

(d)

(e)

(f)

(g)

3,997,753

CONTROL SYSTEM AND METHOD FOR ELECTRIC DISCHARGE MACHINING (EDM) USING A PREDETERMINED PORTION OF EACH DISCHARGE PULSE FOR MONITORING

CROSS-REFERENCE TO RELATED APPLICATIONS

This application is a continuation-in-part of my application Ser. No. 272,463 filed 17 July 1972 now U.S. Pat. No. 3,781,507 as a division of application Ser. No. 19,364 filed 13 Mar. 1970 (U.S. Pat. No. 3,686,461) and which was also related to then pending application Ser. No. 838,575 filed 2 July 1969 (U.S. Pat. No. 3,604,885). This latter application was a continuation-in-part of application Ser. No. 682,824 filed 14 Nov. 1967 (U.S. Pat. No. 3,539,755) and a continuation-in-part of still earlier application Ser. No. 493,473 filed 6 Oct. 1965 (U.S. Pat. No. 3,360,683).

This application also relates to my copending application Ser. No. 338,849 (U.S. Pat. No. 3,875,374) filed 7 Mar. 1973 and referring to U.S. Pat. Nos. 3,536,881, 3,539,755, 3,604,885 and 3,686,461.

FIELD OF THE INVENTION

The present invention relates to a control method and system for an electrical discharge machining (EDM) apparatus and, more particularly, to a method of and a system for maintaining effective machining discharges at the working gap.

BACKGROUND OF THE INVENTION

A typical electrical discharge machining apparatus comprises means for holding a workpiece constituting a first electrode, a tool electrode spacedly juxtaposed with the first electrode across a machining gap, means for applying discharge-voltage pulses across the two electrodes to effect breakdown of the gap and produce an electrical discharge of a transient or short duration so that workpiece material is electrically eroded, a servosystem or the like for maintaining the gap width at the desired level, and means for supplying a dielectric liquid to the gap to sweep the removed detritus and discharge products therefrom and restore a nonconductive state at the gap.

The aforementioned applications and patents relate to various aspects of the control of such apparatus and detail several components of the basic installation.

It has been proposed heretofore to provide voltage pulses of a predetermined duration and interval across the tool electrode and the workpiece to produce respective electric discharges with the discharge current passing for the duration of the applied pulse. High-amplitude voltages may be applied to promote breakdown of the dielectric in the gap. Each time a voltage pulse is supplied, the discharge current flows and a "discharge pulse" is said to be created at the gap, thereby removing material from the workpiece.

However, gap conditions may not be satisfactory to sustain a machining-type discharge and thus various defects may develop in the discharge which is created. For example, if the normally transient or short-duration discharge does not extinguish, a continuous or stationary arc-type discharge may result, thereby producing local overheating without material removal and detrimentally affecting the workpiece, the machining electrode or both. Under certain circumstances no discharge can be created at the gap when the voltage pulse is applied. Both of these latter abnormal conditions, characterized herein as "unsatisfactory" or abnormal discharges are to be contrasted with satisfactory or effective discharges in which the discharge current commences with triggering of the breakdown of the gap, terminates with extinction of the voltage pulse and is effective for the duration of the discharge to remove workpiece material.

It has been found that the normal, satisfactory or good discharge is characterized by an evaluatable range of discharge voltage, discharge current, gap resistance or gap impedance (measured between the machining electrode and the workpiece), the particular range being dependent upon the nature of the tool electrode and the workpiece material, the nature of the liquid dielectric, and the machining condition established to bring about particular machining modes.

The normal, satisfactory or good discharge is also characterized by the presence of a high-frequency component of about 10 megacycles (MHz) which is found superimposed upon the voltage and current waveform.

When the discharge is of the stationary or continuous-arc type, representing abnormal, bad or unsatisfactory discharges, the discharge voltage has a value below the minimum of its range, the discharge current has a value exceeding the maximum of its range and the high-frequency component is diminished or nonexistant in the discharge waveform. It is thus possible to distinguish between normal and abnormal pulses in each pulse cycle by determining whether the discharge voltage or the discharge current is in a predetermined range and whether the discharge contains the high-frequency component mentioned earlier.

While typical normal discharges and typical abnormal discharges can readily be detected in this manner, it has also been found that discharges take place under extremely complex and varying conditions so that there may be formed a semiabnormal discharge which is distinguishable from a typical abnormal discharge but is detrimental in EDM processes. The existence of this semiabnormal discharge has made it difficult, if not impossible, heretofore to provide complete adaptive control of the machining process or system.

OBJECTS OF THE INVENTION

It is the principal object of the present invention to provide a system for the adaptive control of an EDM apparatus whereby disadvantages of earlier systems are obviated and more accurate and satisfactory regulation can be obtained.

It is another object of the invention to provide an improved method for the purposes described which is capable of regulating the EDM shaping of the workpiece in an efficient and significant manner.

Another object of the invention is to provide a system for controlling EDM shaping of the workpiece whereby disadvantages of earlier systems can be obviated.

It is also an object of the invention to provide a highly reliable device for the adaptive control of EDM machining systems.

SUMMARY OF THE INVENTION

According to the principles of the present invention, a gap condition (discharge voltage, discharge current, gap resistance, gap impedance or presence of high-frequency component) is measured or evaluated over a predetermined checking period and satisfactory and unsatisfactory pulses are discriminated, and means is provided for controlling a parameter of the machining operation at the gap to modify the machining conditions to restore the minimum rate of satisfactory discharges to the desired level.

As noted below, the term "a parameter of the machining operation" is meant to include any one or combination of gap width, dielectric flow, pulse energy, as discussed in the aforementioned application Ser. No. 338,849 and the applications mentioned therein.

In accordance with this invention, therefore, I provide a system for determining the rate of occurrence of either the abnormal discharge or the normal discharge, or both. The normal discharges are characterized by a magnitude of one of the aforementioned gap variables in a predetermined range and by having the high-frequency component. The abnormal discharge is defined as a discharge in which the magnitude of this gap variable is not within its predetermined range or is outside this predetermined range and wherein the discharge does not include the high-frequency component.

The method of controlling an electrical discharge machining operation, according to the present invention thus comprises the steps of measuring at least one of the gap variables (gap resistance, gap impedance, discharge current, discharge voltage or development of a high frequency component across the gap) over only a selected limited portion of each discharge to produce a signal representing the measured variable. A circuit is then triggered with this signal to produce an output when the signal bears a predetermined relation to a reference value preset at the circuit. At least one of a number of controllable parameters (e.g. gap width, pulse energy, dielectric flow) is then regulated in response to the output of the latter circuit.

Advantageously, the circuit has a plurality of threshold levels representing respective reference values defining a range of the measured variable corresponding to a satisfactory discharge, the output being produced upon deviation of the measured value from the range. It has been found to be advantageous, as a guide to determining whether a discharge is satisfactory or unsatisfactory, to detect the presence or absence of a high-frequency component across the gap after the discharge has developed. The interval over which measurement takes place according to this invention is subsequent to the initiation of the discharge. I have found that the presence of a high-frequency component of the order of 10 MHz is indicative of a satisfactory discharge provided that at least one other parameter (say the discharge current or the discharge voltage) is within its predetermined range.

Using the basic system described, therefore, I am able to discriminate between satisfactory and unsatisfactory discharges. According to another feature of the invention, the number of satisfactory discharges is counted over a predetermined total number of discharges and the controlled variable is regulated by an output signal produced when the ratio of counted satisfactory pulses to the total number of pulses falls below a predetermined value. Since the discriminator also provides an output indicating unsatisfactory pulses, I may count the unsatisfactory discharges over a predetermined total number of discharges and generate the output for regulating the controllable parameters upon this ratio exceeding a predetermined value.

It is also possible, within this concept, to count separately the number of satisfactory discharges and the number of unsatisfactory discharges and generate the regulating signal upon the ratio of the two falling below a predetermined value.

In its apparatus aspects, the invention may comprise a sensor connectable in circuit with the gap by an electronic switch or gate which effectively allows an output representing the measured gap variable only after the lapse of a predetermined time interval from the application of the voltage pulse triggering the discharge.

One or more threshold circuits are connected to the gap sensor and produce an output upon the measurement signal passing a threshold or reference value at the threshold circuit. In a simple case, a number of such thresholds may be provided and the states of these circuits may be evaluated to determine whether a particular gap variable lies within a range defining a satisfactory discharge or outside this range.

According to another aspect of the invention, the threshold device may have its output connected by gating or logic circuits to one of two counters respectively storing a count of satisfactory discharges and a count of unsatisfactory discharges. Another gap variable may be measured to provide an output representing the total number of discharge pulses and each output may be transformed from an analog signal to a digital or rectangular-waveform signal by a pulse shaper. The output elements may be flip-flops capable of changing state when the two variables indicate a satisfactory or an unsatisfactory discharge, the controllable parameters being regulated in response to the state of the flip-flop.

This invention, moreover, may be used to control the servosystem for regulating the gap width as described in application Ser. No. 272,463, for regulating the dielectric-liquid flow or for modification of some other parameter as described in application Ser. No. 338,849. The system may provide means for deriving an analog system for across the gap with a time-varying amplitude which may be a function of one of the gap variables, the analog system being compared with a threshold to produce a digital output depending upon its relationship to the threshold, i.e. a first digital stage when the analog signal exceeds a threshold value and a second digital state when the analog signal is below a threshold value. These digital states are thereafter employed to control the servomechanism (Ser. No. 272,463) and actuate the latter in a sense or direction determined by the prevalent digital state and to an extent determined by the duration of that state, or operate another parameter-control element (Ser. No. 338,849) in a similar manner.

DESCRIPTION OF THE DRAWING

The above and other objects, features and advantages of the present invention will become more readily apparent from the following description, reference being made to the accompanying drawing in which:

FIGS. 3 and 4 are graphical representations illustrating different characteristic conditions occurring in EDM processes;

SPECIFIC DESCRIPTION

Figure 1:
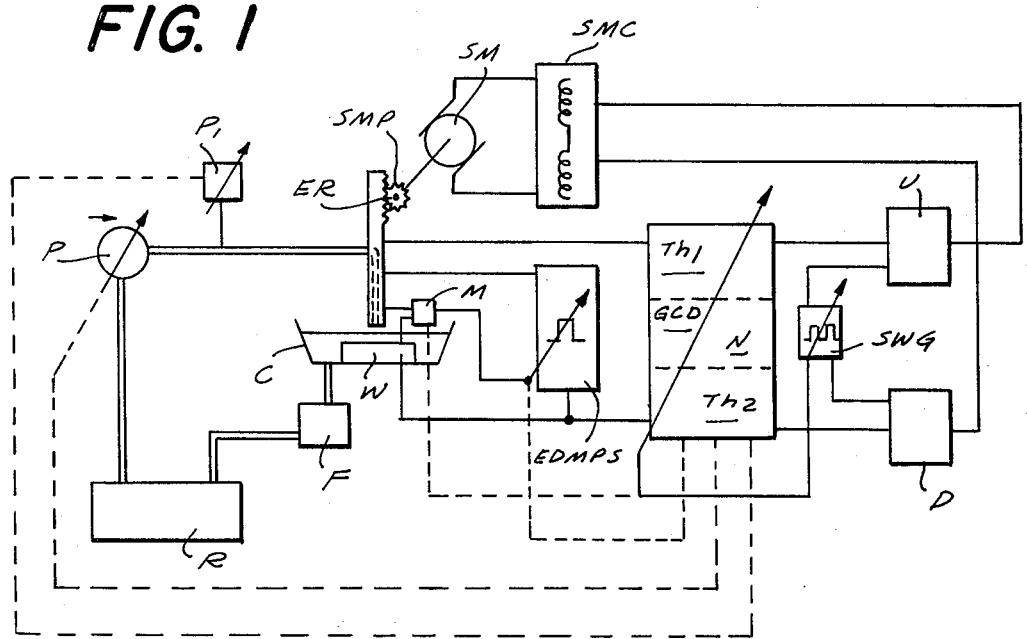
FIG. 1 is a block diagram illustrating a control system for an EDM apparatus according to the invention.

While the discussion herein relates to systems for control of a servomotor as particularly illustrated in FIG. 1 and described in application Ser. No. 272,463, it should be understood that it is equally applicable to control of pulse energy, dielectric flow or any other machining parameter as described in application Ser. No. 338,849 and the prior patents mentioned therein.

In FIG. 1, I have shown diagrammatically a system in which the workpiece is represented at W and is juxtaposed with a tool electrode E. The tool electrode E is hollow and receives a stream of coolant (e.g. a dielectric liquid such as kerosene or transformer oil) from a pump P and a reservoir R. The fluid traversing the machining gap is collected in a pan C and is returned to the reservoir R through the filter E. A machining power supply EDMPS is connected across the electrode E and the workpiece W and is provided with a gap monitor M while being of the type described generally in connection with FIG. 4 of application Ser. No. 272,463, i.e. of the adaptive type with automatic response to gap condition.

The advance (downward movement) of the electrode E or retraction (upward movement) is controlled by a servomotor SM coupled with the electrode E by a rack-and-pinion arrangement ER and SMP and is energized via the bidirectional amplifier or control SMC.

When pulsed feed is desired, one or more oscillators SWG may be provided with variable frequency, pulse height, pulse width and pulse spacing for application to the servocontrol SMC via, for example, coincidence (AND) gates U and D to the respective states of a threshold circuit of the SCHMITT trigger or multivibrator type represented at GCD.

The thresholds $Th_1$ and $Th_2$ determine the digital states which are applied as enabling signals to the gates. A null or dead condition in which no signal is applied to displace the electrode is represented at N for adaptive control, the gap monitor M may be connected to the trigger circuit GCD or to the oscillator circuit SWG and, of course, the trigger circuit GCD may be used to control the pump P or the machining power supply EDMPS as previously noted. Pulse flow of electrolyte may be attained by operating the pulser $P_1$ from the trigger network GCD. Thus it will be apparent that the output of the control system may be applied to alter any of the machining parameters to restore a satisfactory gap condition.

FIGS. 3 and 4 show how different characteristic conditions actually occur in EDM and also illustrate the relationship of this gap condition to detectable gap voltages. In FIG. 4, for example, the curve A represents the typical voltage change during a single pulse of a liquid-phase discharge with a high-energy discharge column fully pinched by the ambient liquid. Curve B represents the voltage change with time of a gaseous discharge with the discharge column substantially expanded by increased quantities of metal vapor and gas. Curve C represents a liquid/gas mixed-phase discharge which is the optimum for machining. Curve D represents short-circuiting and E represents the voltage change over a quasi short-circuit resulting from the presence of debris of decomposed products and/or machine chips.

As these curves indicate, it has been found that clear discrimination between the conditions is obtainable by monitoring the gap within the time interval between $t_1$ and $t_2$ corresponding approximately to the interval between one tenth and one fifth of the entire pulse width or during the time interval between $t_3$ and $t_4$, i.e. a similar interval of one tenth to one fifth of the pulse width at about one half of the pulse duration. Thus, by establishing three threshold levels, for example, it is possible to distinguish these time variant discharge conditions from one another.

Figure 2:
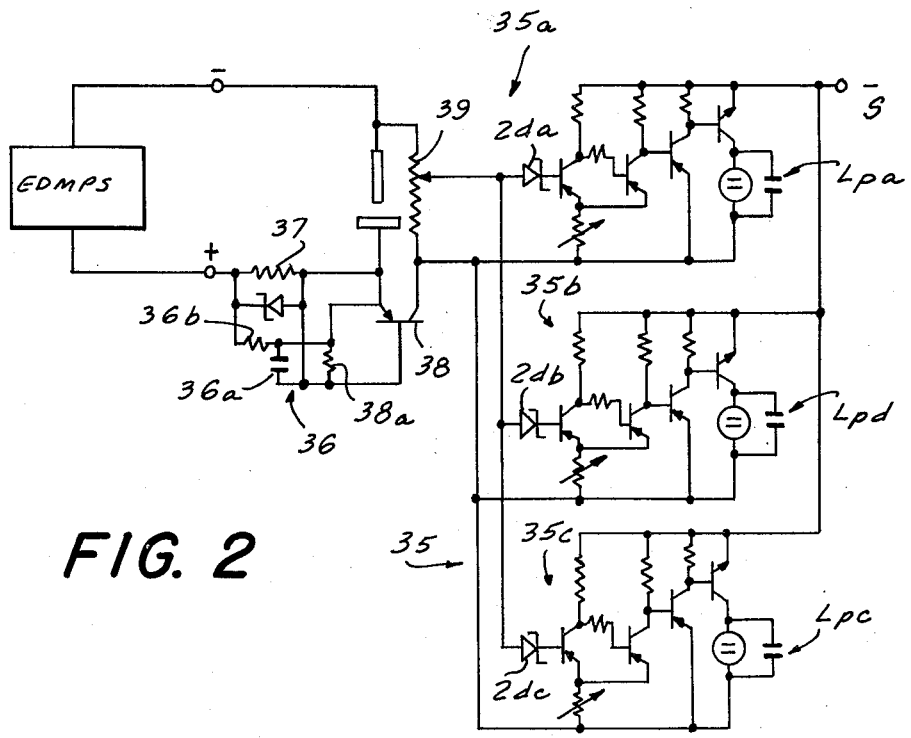
FIG. 2 is a circuit diagram of a system for providing gap-characterizing signals which may be used for adaptive control.

In FIG. 2 there is shown a gap monitor 35 which responds to the time variant discharge condition described in connection with FIGS. 3 and 4. The gap monitor 35 comprises three threshold discriminators 35a, 35b and 35c for inspecting gap characteristics during a given time period within each machining pulse. To this end, delay means 36 is provided which permits these discriminators to respond to a gap signal selectively during such a time period.

The delay means comprises a capacitor 36a adapted to begin charging via a resistor 36b in response to the initiation of each discharge as indicated by a voltage drop developed at a sensing resistor 37 connected in series with the machining gap and one terminal of a machining power supply EDMPS.

The positive terminal of capacitor 36a is connected with the emitter of PNP transistor 38 and its negative terminal is connected with the base of this transistor, a base-bias resistor 38a being provided between the emitter and base.

The emitter and collector of transistor 38 are connected in series with a gap-monitoring resistor 39 so that the series connection is provided across the machining gap. Thus it will be seen that after a given delay time after initiation of a machining pulse, the capacitor 36a discharges and transistor 38 is rendered conductive to connect the gap-information or gap-monitoring resistor 39 to the gap and permit a development thereacross of a signal proportional to the existing gap voltage only for the time period determined by the discharge time of capacitor 36a.

Each of the threshold discriminators 35a, 35b, 35c may be constituted by a Schmitt circuit as shown, coupled with a Zener diode Zda, Zdb and Zdc provided at the input side thereof. The preset Schmitt transition voltage as well as the respective Zener breakdown voltage determine a particular threshold value to be established.

Since the short-circuit voltage is approximately nil, the gaseous discharge voltage is about 30 volts, the mixed gas/liquid discharge voltage is about 40 volts, and the liquid-phase discharge voltage approaches 50 volts during the period from $t_1$ to $t_2$ in a typical situation, it is apparent that the three threshold levels for discriminators 35a, 35b and 35c, when set for example at 20 volts, 35 volts and 45 volts, respectively, provide clear demarcations between these characteristic discharges.

At the output of each discriminator there is provided a lamp Lpa, Lpb, Lpc energizable by a source S. The gap signal, when it exceeds the respective threshold values illuminates these lamps. Thus, during the period $t_1-t_2$, when the gap is short-circuited, all of the lamps are off. When a gaseous discharge occurs only lamp Lpa is illuminated. When the discharge is of the mixed gas/liquid type, the second lamp Lpb is also illuminated. When the discharge is of the liquid phase type, all of the lamps are lit. The light signals may be applied to a servocircuit as described in application Ser. No. 272,463 to adjust the threshold for gap control and/or the feed rates of dielectric or electrode so that the electrode may be controlled in a manner to adapt to a particular gap condition. For example, the resistor Rg of FIG. 7 of that application may be constituted by a photo-conductor to which light signals from lamps L$pa$, L$pb$ and L$pc$ may be applied. In the system of FIG. 1 of application Ser. No. 272,463, such a photo-conductor may form the resistor 10$a$. The system of FIG. 2 of the latter application may also be made adaptive by providing a photo-conductor in parallel with Schmitt resistor 112$r$ and rendering it responsive to signals from the adaptive system 35. Furthermore, other parameters as described in connection with FIG. 1 of the present application or in application Ser. No. 338,849 may be adjusted with the output of the lamps or an equivalent electrical signal.

Figure 5:
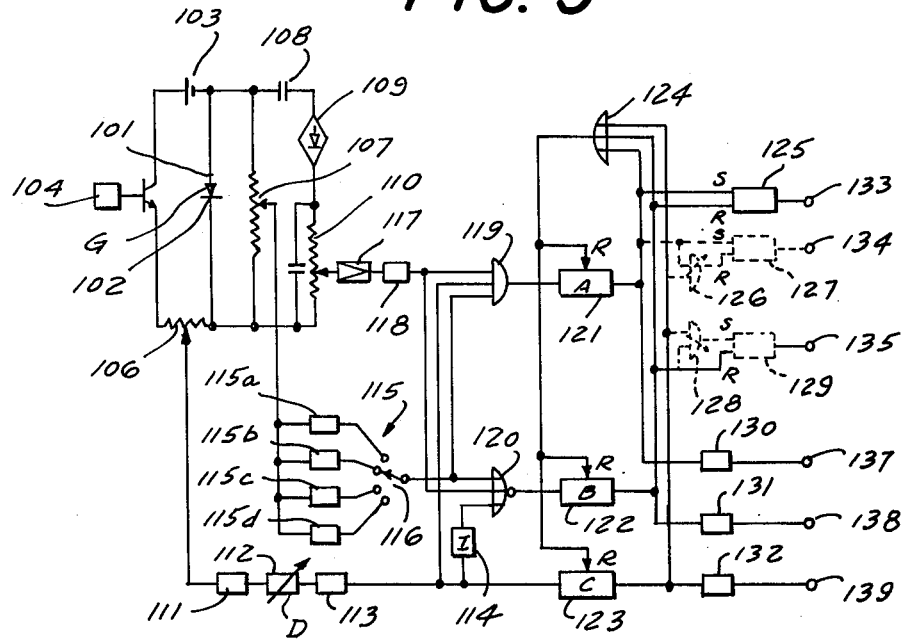
FIG. 5 is a block diagram of another system for adaptive control of the EDM process.
Figure 6:
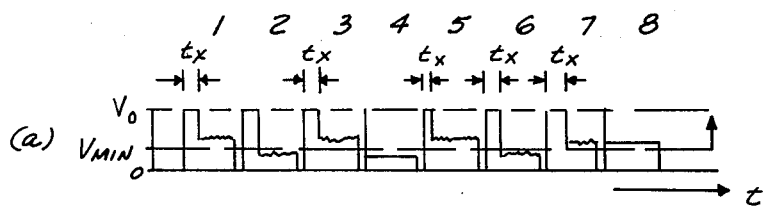
FIG. 6 is a pulse and wave diagram illustrating the operation of the system of FIG. 5.
Figure 6:
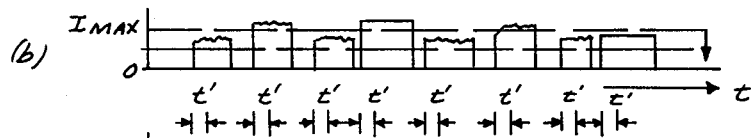
Figure 6:
Figure 6:
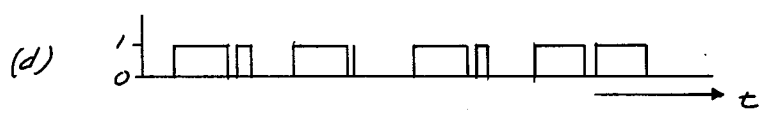
Figure 6:
Figure 6:
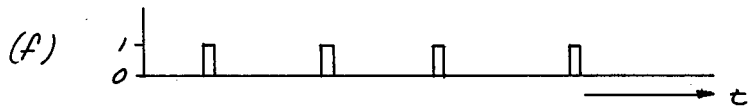
Figure 6:

Referring now to FIGS. 5 and 6 wherein another embodiment of the present system is disclosed, it will be apparent that the machining electrode 101 is juxtaposed with the workpiece 102 across the dielectric-filled machining gap G. A direct current source 103 is provided to supply the machining power. A power switch 105 is connected in circuit with the source 103 and the gap and is operable by a triggering network 104 for initiating the machining-discharge pulse, terminating same and providing a selected pulse duration and interval. Dielectric liquid may be supplied to the gap and the machined chips and discharge products carried away from the gap in a manner as described in connection with FIG. 1 or alternatively by effecting an intermittent relative retraction between the machining electrode 101 and the workpiece as described in application Ser. No. 338,849.

A resistor 106 in series with the source 103 and the gap G serves to sense the discharge current while a resistor 107 is connected across the gap to detect the gap voltage. A capacitor 108 lies between the voltage-measuring resistor 107, a rectifier 109 and a resistor 110 responsive to the high frequency component of the voltage across the gap. Capacitor 108 here constitutes a direct-current blocking element passing the high frequency component.

Connected to the current-sensing resistor 106 is a pulse-shaping network 111 and the latter feeds an ON-delay network 112. A second pulse shaper 113 is connected with the ON-delay network 112 and works into an inverter 114 and a preset counter 123. A plurality of Schmitt trigger circuits are represented collectively at 115 and include the circuit 115$a$ through 115$d$ while a rotary switch 116 has an arm selectively connectable with these Schmitt trigger circuits. As described in connection with FIG. 2, the Schmitt trigger circuits have respective thresholds or triggering levels.

An amplifier 117 is connected to the high-frequency detector resistor 110 and feeds a pulse-shaping circuit 118 working into an AND gate 119 also receiving an output from the common terminal of switch 116. The switch 116, the pulse shaper 118 and the inverter 114 provide inputs to NOR gate 120 which feeds a counter 122. The AND gate 119 feeds the preset counter 121 and the reset signal to each of the counters 121-123 is provided by an OR-gate 124. A set-reset flip flop 125, whose set terminal is represented at S and whose reset terminal is shown at R has an output terminal 133 and its set terminal connected to the output of counter 121. Its reset terminal R is connected to the output of counter 122. The set-reset flip flops 127 and 129 have output terminals 134 and 135 and respective set-reset terminals connected to the outputs of counters 121 and 123 and to the outputs of counters 121 and 122, respectively. Individual outputs for the counters 121, 122 and 123 are provided at 137, 138 and 139 in series with output circuits 130, 131 and 132 respectively. Inhibit gates 126 128 are provided between the output of counter 123 and the control inputs of the flip flops 127 and 129.

Reference is made herein to PULSE, DIGITAL AND SWITCHING WAVEFORMS McGraw-Hill Book Company, New York, 1965, for detailed descriptions of the several logic circuits described. For example, the AND-gate or coincidence gate is described at pages 317 through 321 and pages 630–681, the OR-gate is described at pages 312 through 317, the NOR-gate is described at pages 330–334, the INHIBIT-gate is described at pages 325 and 326, the Schmitt trigger circuit is described at pages 389–394, the flip flops are described at pages 362 ff, etc.

When the power transistor or switch 105 is rendered conductive by control-pulse generator 104, the machining voltage develops across the machining electrode 101 and the workpiece 102 and, upon the lapse of a variable time $t_x$ (FIG. 6) triggers and initiates an electric discharge across the gap G. The machining voltage and discharge current characteristics are shown by the waveform diagrams ($a$) and ($b$), respectively, in FIG. 6. In these diagrams the first, third, fifth and seventh pulses illustrated represent normal or satisfactory discharges, each of which has voltage magnitude greater than the lower threshold value Vmin and a current magnitude lower than the upper threshold values Imax and includes a high frequency component. The other pulses illustrated represent abnormal or unfavorable pulses.

The second pulse, for example, has voltage and current magnitudes each of which is outside the threshold range. The fourth pulse does not contain the high-frequency signal and represents a stationary or continuous arc discharge. The sixth pulse has a high-frequency signal appearing just after the initiation of the discharge and then disappearing. The eighth pulse has voltage and current magnitudes within the respective threshold values but does not contain a high-frequency signal.

Each discharge-current pulse traversing the resistor 106 generates a control voltage pulse which is shaped at 111 and from inputs to the delay network 112 having a preset delay time $t'$ whereupon the narrow pulses of preset on time are formed as shown at FIG. 6, diagram ($c$). The pulses are applied to the AND-gate 119 directly and to the NOR-gate 120 through the inverter 114.

Each voltage pulse applied across the machining electrode 101 of the workpiece 102 also generates a signal in the sensing resistor 107 connected in parallel with the gap G and tapped to hold a voltage signal proportional to the magnitude of the machining voltage. This signal is applied as an input to the Schmitt trigger circuit 115$a$–115$d$ selected by the rotary switch 116.

Each voltage pulse applied across the gap $G$ is detected by the voltage-measuring resistor 107 which is tapped to provide a voltage signal proportional to the gap voltage and applied to the inputs of the SCHMITT triggers 115$a$ – 115$d$ .... One of the SCHMITT trigger circuits has its reference level preset to correspond to the threshold lower limit V$_{min}$ (diagram $a$ of FIG. 6) and produces an output in the form of pulses for the duration in which each machining voltage pulse has a level above $V_{min}$. These signal pulses are shown in diagram (d) of FIG. 6 and are transmitted through the rotary switch 116 to the AND-gate 119 and the NOR-gate 120.

The presence of a high-frequency component in the signal across the gap is detected by the network consisting of blocking capacitor 108, rectifier 109 and resistor 110 in such manner that, when the high-frequency component is present, an analog voltage (direct current) appears across the resistor 100 and can be tapped to the amplifier 117. The signal delivered by amplifier 117 to the pulse shaper 118 results in a pulsed output to the coincidence or AND-gate 119 and is shown in diagram (e) of FIG. 6. In other words, each machining voltage pulse of diagram (a) results in a signal at resistor 110, only if a high-frequency component appears, this signal being converted by amplifier 117 and the pulse shaper 118 into a rectangular-waveform pulse which coincides with the duration of the high-frequency signal, as converted by rectifier 109 to a D-C signal. The signals of diagram e of FIG. 6 are, of course, applied to both the coincidence gate (AND-gate) 119 and the NOR-gate 120.

The AND-gate 119 is triggered by the checking pulse from the delay timer 112 when the latter coincides with a pulse from the selected SCHMITT trigger circuit 115a – 115d and the high-frequency detector 110, 117, 118, the output of gate 119 representing a normal, satisfactory or "OK" discharge. The output of AND-gate 119 is shown in diagram f of FIG. 6.

The pulsed output of gate 119 is applied to the counter 121 which accumulates a count of the OK discharges. The checking pulse applied to the NOR-gate 120 only causes a signal to pass when it fails to receive an output from the selected SCHMITT trigger 115a– 115d and fails to receive from shaper 113 a signal indicating a satisfactory current level, and it also fails to receive an indication that the high-frequency signal is present from the network 110, 117, 118. The output of the NOR gate is represented in diagram q of FIG. 6 and two such checking pulses of course are formed for the pulse sequence of diagram (a) of FIG. 6.

The presettable counter 121 connected to the AND-gate 119 registers OK-signal pulses and provides an output signal when the counter reaches a preset number $n_1$. Similarly the preset counter 122 counts NG (no good) pulses representing defective machining pulses and provides an output signal when the counter reaches a value $n_2$. The counter 123 qccumulates the checking pulses from timer 112 and provides an output signal when its count reaches a preset number N, each counter automatically resetting itself when the preset count is reached in any one of them, irrespective of the counting state period.

The output signal of counter 121 is applied to the set terminal of the flip-flop 125 (or the set terminal of the flip-flop 127 and to the control input terminal of IN- HIBIT-gate 126).

The output signal of the counter 122 is fed to the reset terminal of flip-flop 125 (and to the reset terminal of the flip-flop 129 or a control input of its INHIBIT-gate 128).

The output signal of counter 123 is applied to the reset terminal of flip-flop 127 via the INHIBIT-gate 126 or the reset terminal of the flip-flop 129 via the INHIBIT-gate 128. In addition this output is applied to the OR gate 124 mentioned below for resetting all of the counters when any one of them attains the count preset therein.

Presetting of the values $n_1$, $n_2$ and N is established to satisfy the relationship $N > n_1 > n_2$ and the ratio $n_2/n_1$ and/or $n_2/N$ has a predetermined value. When four unsatisfactory or NG pulses may be tolerated for every eight satisfactory or OK pulses, $n_1$ is set at eight and $n_2$ is set at four. Only the flip-flop 125 need be used and it is not necessary to set the counter 123. This mode of operation is described hereinafter as EXAMPLE I.

When the instructions are to the fact that eight satisfactory or OK pulses are required for every twelve total discharge pulses, $n_1$ is set at eight, N is set at twelve and the INHIBIT-gate at 126 and the flip-flop 127 are used without the NOR-gate 120, counter 122, flip-flops 125 and 129, or INHIBIT-gate 128. This mode of operation is EXAMPLE II.

When four unsatisfactory or NG pulses are all that may be tolerated for twelve total discharge pulses, counter 122 is preset for $n_2$ of four while counter 123 is set of N = 12. INHIBIT-gate 128 and flip-flop 129 are used without the AND-gate 119, the counter 121 the flip-flops 125 and 127, or the INHIBIT-gate 126. This mode of operation is referred to hereinafter as EXAMPLE III.

It should be observed, in passing, that counter 121 counts only satisfactory or normal pulses, counter 122 registers only unsatisfactory or abnormal pulses, and counter 123 responds to all pulses. Quasi-abnormal pulses thus will not register on counters 121 and 122 but will be detected by counter 123.

In EXAMPLE I the counter 121 operates before counter 122 in producing an output signal and holds the flip-flop 125 in the set state, resetting itself and counter 122 while machining proceeds in a favorable manner, i.e. the number of satisfactory pulses equals or exceeds the ratio to unsatisfactory pulses established by presetting the counters. Of course, when unfavorable machining conditions develop, the counter 122 will reach its preset count prior to counter 121 and flip-flop 125 will be reset.

In EXAMPLE II, while the machining proceeds favorably, counter 121 will count up to its preset value concurrently with or before the counter 123 to produce a signal which holds the flip-flop 127 in the set state and resetting itself and the other counter 123. When machining proceeds under undesirable circumstances, the counter 123 will first reach its present count and thereby reset the flip-flop 127.

In EXAMPLE III, the counter 123 will either coincide with counter 122 or precede the latter in attaining the preset count. It thus provides an output signal which holds the flip-flop 129 in the set state and resets itself and counter 122 at the end of each pulse sequence. Under unfavorable discharge conditions, however, counter 122 will reach its preset count sooner and reset the flip-flop 129.

Thus each of the flip-flops 125, 127 and 129 is held in the set state as long as satisfactory machining continues and is shifted into a reset state upon deviation from satisfactory machining conditions. The switch to the preset state provides at the output terminals 133, 134, 135 an output signal which is used to control the machining operation by modifying one of the parameters, e.g. by augmenting the dielectric flow rate, by increasing the length of intermittent retraction of the tool electrode and/or decreasing the time interval between adjacent cycles of such retraction, by increasing the gap width, by modifying the energy of the next succeeding pulse or pulse train or by increasing the time interval between adjacent succeeding pulses. The delay system 112 etc. ensures that the checking period does not include the period immediately preceding and following the initiation the discharge, since this discharge-initiating period gives rise to complex electrical and physical conditions which cannot be discriminated readily to determine whether the discharge pulse is satisfactory or unsatisfactory. For example, a pulse which appears to be a thermal arc or quasi-abnormal arc may appear to have initially a high-frequency component, a high voltage and a low current.

EXAMPLES I – III differ in dealing with quasi-abnormal discharge pulses. Consequently one may employ this ability to discriminate between various quasi-abnormal discharges for various control purposes.

It should be noted that the pulse-shaping circuit 113 may be a one-shot trigger circuit, e.g. a SCHMITT trigger or a monostable multivibrator, that such trigger may be connected to the AND gate 119 and the inverter 114. Alternatively, it may apply an input directly to the shaping circuit 118 and to one of the SCHMITT trigger reference circuits 115a – 115d to control or energize them. The selector switch 116 may be a rotary switch or an electronic or electrical commutator or other switching device while the preset counters may be replaced by a divider circuit, ring counters or the like. The set-reset flip-flops may be replaced by K – J flip-flops, in which case the INHIBIT-gates 126 and 128 may be eliminated. The system may be provided in combination with a device responsive to short-circuiting as described in the aforementioned applications or patents to further enhance the utility of the arrangement.

I claim:

1. A method of detecting electrical discharges of a particular class for controlling a parameter in the operation of an electrical discharge machining apparatus in which a series of electric pulses are applied across a dielectric-filled machining gap between a tool electrode and a workpiece juxtaposed therewith, the pulses resulting in electrical discharges of different characteristic classes, the method comprising the steps of:

measuring a gap variable over a selected time period within each electrical discharge to produce a signal specific to the individual discharge representing the measured value, and comparing the measured value with a reference value by applying said signal to a circuit having a threshold level corresponding to said reference value and defining a range of a measured value corresponding to electrical discharges of said particular class to produce an output representing the latter, said selected portion of said discharge being subsequent to initiation thereof.

2. A device for detecting electrical discharges of a particular class for controlling a parameter in the operation of an electrical discharge machining apparatus having a power supply for applying a series of electric pulses across a dielectric-filled machining gap between a tool electrode and a workpiece juxtaposed therewith, the pulses resulting in electrical discharges of different characteristic classes, said device comprising a sensor connected to said gap for measuring a gap variable over only a selected time period within each electrical discharge but subsequent to initiation thereof to produce a signal specific to the individual discharge representing the measured variable, and circuit means connected to said sensor and having a threshold level defining a range of a measured value corresponding to electrical discharge of said particular class for producing an output representing the latter.

3. A device for detecting electrical discharges of a particular class for controlling a parameter in the operation of an electrical discharge machining apparatus having a power supply for applying a series of electric pulses across a dielectric-filled machining gap between a tool electrode and a workpiece juxtaposed therewith, the pulses resulting in electrical discharges of different characteristic classes, said device comprising a sensor connected to said gap for measuring a gap variable over only a selected time period within each electrical discharge to produce a signal representing the measured variable, and circuit means connected to said sensor and having a threshold level defining a range of a measured value corresponding to electrical discharge of said particular class for producing an output representing the latter, said device further comprising a switch in circuit with said sensor and enabling effective connection thereof to said gap, and delay means responsive to the initiation of a voltage pulse for operating said switch and rendering said sensor effective upon the lapse of a predetermined period subsequent to such initiation.

4. A device for detecting electrical discharges of a particular class for controlling a parameter in the operation of an electrical discharge machining apparatus having a power supply for applying a series of electric pulses across a dielectric-filled machining gap between a tool electrode and a workpiece juxtaposed therewith, the pulse resulting in electrical discharges of different characteristic classes, said device comprising a sensor connected to said gap for measuring a gap variable over only a selected time period within each electrical discharge to produce a signal representing the measured variable, and circuit means connected to said sensor and having a threshold level defining a range of a measured value corresponding to electrical discharge of of said particular class for producing an output representing the latter, said circuit means including a plurality of SCHMITT trigger circuits connected in parallel with one another to said sensor, said SCHMITT circuits having respective threshold values defining ranges of the measured variable corresponding to respective discharges of different classes.

5. A device for detecting electrical discharges of a particular class for controlling a parameter in the operation of an electrical discharge machining apparatus having a power supply for applying a series of electric pulses across a dielectric-filled machining gap between a tool electrode and a workpiece juxtaposed therewith, the pulses resulting in electrical discharges of different characteristic classes, the device comprising circuit means responsive to a gap variable over only a selected time period within each discharge after the initiation thereof and having a threshold level defining a range of the magnitude of said variable corresponding to electrical discharges of said particular class for producing an output representing the latter.

* * * * *